United States Patent
Timmermans et al.

(10) Patent No.: US 9,945,492 B2
(45) Date of Patent: Apr. 17, 2018

(54) NORMALLY HIGH SOLENOID ASSEMBLY

(71) Applicant: Continental Automotive Systems, Inc., Auburn Hills, MI (US)

(72) Inventors: Marc Timmermans, Gooik (BE); Eddy Wilgenhof, Buizingen (BE); Marie-Noelle Gris, Niel (BE); An Huyghe, Zemst (BE); Peter Steylaerts, Berlaar (BE); Koen Vermolen, Boechout (BE); Johan Van De Plas, Baal (BE)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/489,713

(22) Filed: Sep. 18, 2014

(65) Prior Publication Data
US 2015/0102243 A1    Apr. 16, 2015

Related U.S. Application Data (60) Provisional application No. 61/891,001, filed on Oct. 15, 2013.

(51) Int. Cl.
  *F16K 31/02*    (2006.01)
  *F16K 31/06*    (2006.01)
  (Continued)

(52) U.S. Cl.
  CPC .......... *F16K 31/0686* (2013.01); *F16K 1/14* (2013.01); *F16K 27/029* (2013.01);
  (Continued)

(58) Field of Classification Search
  CPC .......... F16K 31/0686; F16K 31/0665; F16K 31/0631; F16K 39/02; F16K 1/14;
  (Continued)

(56) References Cited

U.S. PATENT DOCUMENTS

| | | | | |
|---|---|---|---|---|
| 3,661,183 A | * | 5/1972 | Komaroff | F16K 31/0631 137/625.65 |
| 3,707,992 A | * | 1/1973 | Ellison | F16K 31/0627 137/625.65 |

(Continued)

FOREIGN PATENT DOCUMENTS

| | | |
|---|---|---|
| CN | 201297403 Y | 8/2009 |
| CN | 201302000 Y | 9/2009 |

(Continued)

OTHER PUBLICATIONS

European Patent Office Search Report dated Mar. 19, 2015.
DE102007040691 English Machine Translation.
DE102005049122 English Machine Translation.

*Primary Examiner* — Minh Le (57) ABSTRACT

A solenoid assembly for providing control over fluid pressure distribution in a transmission, where the solenoid assembly includes a sleeve, a valve portion substantially contained within the sleeve, an armature located within the sleeve, a plunger connected to the armature and in contact with the valve, and a housing located within the sleeve in proximity to the armature. The armature is moveable relative to the sleeve and the housing, and the valve portion includes a valve, where the movement of the valve is controlled by the movement of the armature. The valve is biased towards an open position to provide a fluid pressure balance between multiple ports.

22 Claims, 5 Drawing Sheets

(51) Int. Cl.
*F16K 1/14* (2006.01)
*F16K 39/02* (2006.01)
*F16K 27/02* (2006.01)

(52) U.S. Cl.
CPC ...... *F16K 31/0631* (2013.01); *F16K 31/0665* (2013.01); *F16K 39/02* (2013.01)

(58) Field of Classification Search
CPC ........... F16K 27/029; Y10T 137/87217; Y10T 137/67209; Y10T 137/87241
USPC ...... 137/596.17, 596.16; 251/129.15, 129.06
See application file for complete search history.

(56) References Cited

U.S. PATENT DOCUMENTS

| | | | | |
|---|---|---|---|---|
| 4,578,662 | A * | 3/1986 | Slavin | F16K 31/0631 137/625.65 |
| 4,635,683 | A * | 1/1987 | Nielsen | H01F 7/13 137/625.65 |
| 4,756,331 | A * | 7/1988 | Stegmaier | F16K 31/0627 137/271 |
| 4,783,049 | A * | 11/1988 | Northman | F16H 61/0009 137/625.65 |
| 4,998,559 | A * | 3/1991 | McAuliffe, Jr. | F16H 61/0251 137/596.17 |
| 5,050,642 | A * | 9/1991 | Bright | F16K 31/0631 137/625.65 |
| 5,135,027 | A * | 8/1992 | Miki | F16K 31/0631 137/596.17 |
| 5,160,116 | A * | 11/1992 | Sugiura | F16K 31/0665 137/596.17 |
| 5,476,313 | A * | 12/1995 | Lauer | B60T 8/365 251/129.15 |
| 5,651,391 | A * | 7/1997 | Connolly | F15B 13/0405 137/454.6 |
| 6,209,563 | B1 * | 4/2001 | Seid | F15B 13/0405 137/15.21 |
| 6,481,452 | B2 * | 11/2002 | Reuter | B60T 8/363 137/14 |
| 6,755,390 | B2 * | 6/2004 | Masuda | B60T 8/363 251/129.15 |
| 6,866,063 | B2 * | 3/2005 | Avila | G05D 16/2013 137/596.17 |
| 6,877,526 | B2 * | 4/2005 | Burrola | F16K 11/048 137/596.17 |
| 6,997,436 | B2 * | 2/2006 | Barron | B60T 8/363 251/129.15 |
| 7,051,993 | B2 * | 5/2006 | Kim | F02M 51/0685 251/129.15 |
| 7,137,411 | B2 * | 11/2006 | Golovatai-Schmidt | F16K 31/0637 137/625.65 |
| 7,243,680 | B2 * | 7/2007 | Golovatai-Schmidt | F01L 1/34 137/596.17 |
| 7,523,763 | B2 * | 4/2009 | Katsuta | F15B 13/0405 137/625.27 |
| 7,866,625 | B2 * | 1/2011 | Lee | B60T 8/363 251/129.15 |
| 8,127,791 | B2 * | 3/2012 | Najmolhoda | F16K 31/062 137/596.17 |
| 9,133,728 | B2 * | 9/2015 | Buse | F16K 31/0627 |
| 2005/0173979 | A1 | 8/2005 | Voss | |
| 2006/0261301 | A1 * | 11/2006 | Eiser | B60T 8/363 251/129.02 |
| 2006/0278838 | A1 * | 12/2006 | Chavanne | F16K 31/0631 251/129.15 |
| 2007/0284008 | A1 * | 12/2007 | Brower | F16K 31/0624 137/625.25 |
| 2008/0196777 | A1 * | 8/2008 | Ross | F15B 13/044 137/625.65 |
| 2008/0276907 | A1 * | 11/2008 | Abe | F02D 41/20 123/472 |
| 2010/0252763 | A1 * | 10/2010 | Courth | B60T 8/367 251/129.15 |
| 2011/0253919 | A1 * | 10/2011 | Imamura | F16H 61/0251 251/129.15 |
| 2013/0048106 | A1 * | 2/2013 | Lee | F01L 13/00 137/492.5 |
| 2013/0264506 | A1 | 10/2013 | Schnelker et al. | |
| 2014/0311440 | A1 * | 10/2014 | Lee | F01M 1/16 123/196 CP |
| 2015/0020901 | A1 * | 1/2015 | Becker | F16K 31/0655 137/557 |

FOREIGN PATENT DOCUMENTS

| | | |
|---|---|---|
| CN | 101868386 A | 10/2010 |
| CN | 102292581 A | 12/2011 |
| CN | 102717787 A | 10/2012 |
| DE | 102005049122 A1 | 10/2006 |
| DE | 102007040691 A1 | 3/2009 |
| JP | 2000154883 A | 6/2000 |
| JP | 2006063993 A | 3/2006 |
| JP | 2006071003 A | 3/2006 |
| JP | 2007-333211 A | 12/2007 |
| JP | 2013-104561 A | 5/2013 |
| JP | 2013100915 A | 5/2013 |
| KR | 1020120109122 A | 10/2012 |
| WO | 2012079889 A1 | 6/2012 |

* cited by examiner

NORMALLY HIGH SOLENOID ASSEMBLY

CROSS-REFERENCE TO RELATED APPLICATIONS

This application claims the benefit of U.S. Provisional Application No. 61/891,001 filed Oct. 15, 2013. The disclosure of the above application is incorporated herein by reference.

FIELD OF THE INVENTION

The invention relates generally to a solenoid assembly which ensures stable force balance and pressure control with magnetic and hydraulic forces.

BACKGROUND OF THE INVENTION

Solenoids are generally known, and some solenoids are used to control fluid pressure in different types of hydraulic systems. Some transmissions use open-loop systems to control the actuation of different components, and control pressure in different locations in the transmission. Some types of highly precise solenoids have been incorporated into these open-loop applications. However, many different types of solenoids have issues with contamination, and disproportionate magnetic and hydraulic forces during operation. Additionally, despite these solenoids having high levels of precision, the control units for these solenoids need to be individually calibrated in production. Accordingly, there exists a need for a solenoid assembly which overcomes the aforementioned drawbacks, and may be used as part of a closed-loop feedback control system in a transmission to eliminate the need for calibration of the controller.

SUMMARY OF THE INVENTION

The present invention is a normally high solenoid assembly for a transmission, where the normally high solenoid assembly has a normally high output when inactivated. The solenoid assembly includes a sleeve, a valve portion substantially contained within the sleeve, an armature located within the sleeve, a plunger connected to the armature and in contact with the valve, and a housing located within the sleeve in proximity to the armature. The armature is moveable relative to the sleeve and the housing, and the valve portion includes a valve, where the movement of the valve is controlled by the movement of the armature.

An inner cap is connected to the sleeve, and a back spring is located within the sleeve in between the inner cap and the armature. The back spring biases the armature away from the inner cap and toward the housing, such that the back spring biases the valve toward a closed position. A return spring is disposed between the housing and the armature, and the return spring biases the armature away from the housing and toward the inner cap, such that the return spring biases the valve toward an open position.

A valve seat is part of the valve portion and surrounded by the sleeve, the valve selectively in contact with the valve seat. A supply port, a control port, and an exhaust port are formed as part of the sleeve such that the supply port, the control port, and the exhaust port are in fluid communication with the valve portion. A coil at least partially surrounds the sleeve, the coil being part of the solenoid portion.

A separation plate is located within the sleeve such that the plunger extends through the separation plate. The separation plate is located in the sleeve between the exhaust port and the armature to substantially prevent fluid from flowing around the housing and the armature and limiting the movement of the armature.

When the coil is de-energized, the combination of hydraulic force in the supply port and forces from the back spring and the return spring is applied to the valve is such that the valve is held in the open position, allowing fluid in the supply port to flow into the control port. When the coil is energized, the magnetic force between the armature and the housing, combined with the forces from the back spring and the return spring, and the hydraulic force from the supply port move the valve relative to the valve seat such that a portion of the fluid in the supply port flows through the control port, and a portion of the fluid in the supply port flows through the exhaust port.

In one embodiment, the coil is energized to move the armature, the plunger, and valve between the open position and closed position to provide a pressure balance between the fluid in the supply port and the fluid in the control port.

The sleeve includes a small diameter portion and a large diameter portion integrally formed with the small diameter portion. The armature is substantially surrounded by the large diameter portion, and the valve portion is substantially surrounded by the small diameter portion. The supply port, the control port, and the exhaust port are all integrally formed as part of the small diameter portion of the sleeve, and the separation plate is disposed in the large diameter portion of the sleeve.

The valve portion includes a first insert and a second insert disposed in the small diameter portion of the sleeve. An exhaust seat is formed as part of the first insert, and a supply seat is formed as part of the second insert. The valve is in contact with the supply seat when the valve is in the closed position, and the valve moves away from the supply seat and towards the exhaust seat when the valve is moved to the open position.

Different types of manufacturing methods may be used to create the solenoid assembly. In one embodiment, the sleeve and the separation plate are deep drawn parts, but it is within the scope of the invention that other types of manufacturing methods may be used.

In one embodiment, the solenoid assembly of the present invention is used in a closed-loop feedback control system in a hydraulic system for a transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
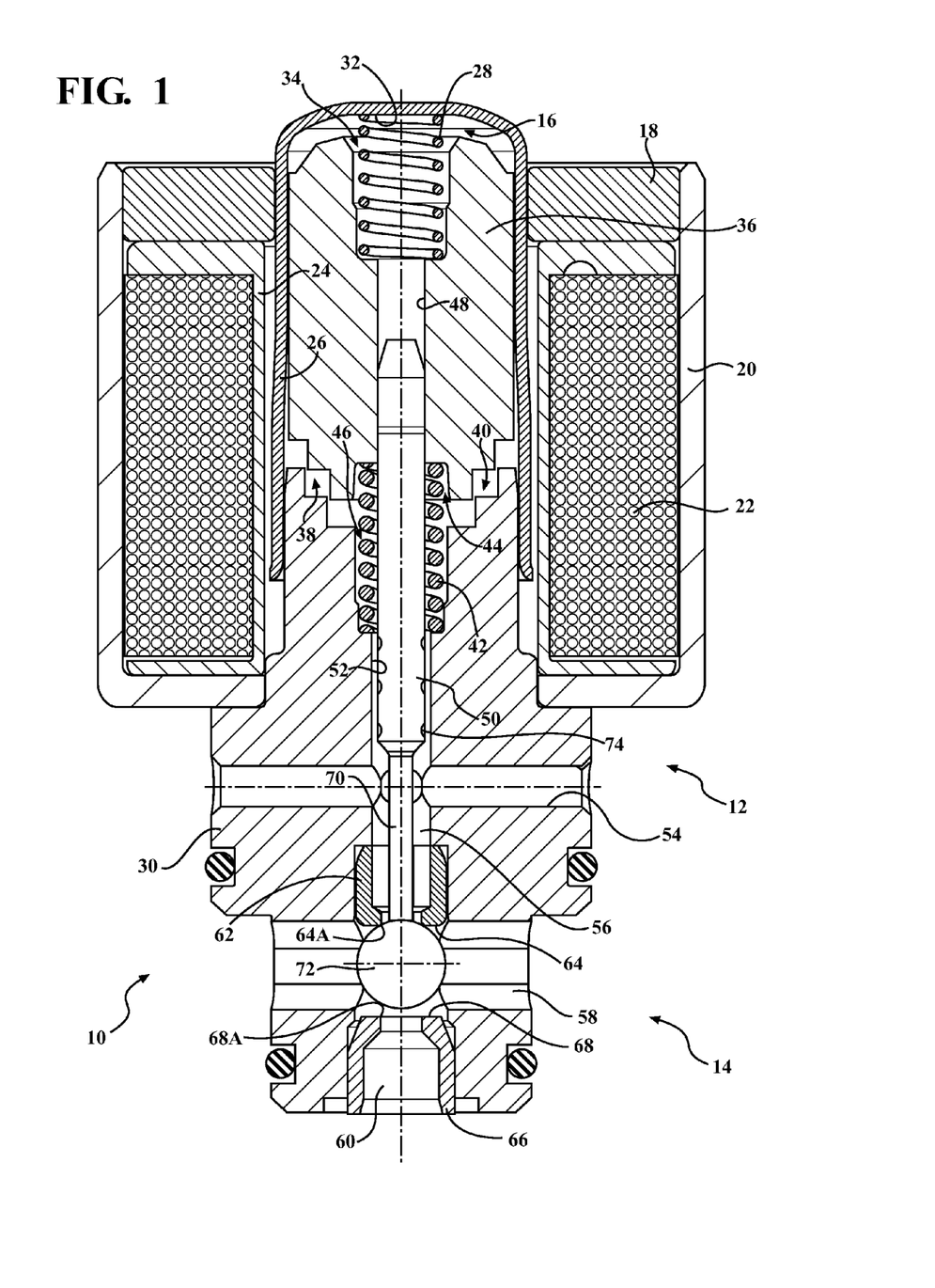
FIG. 1 is a sectional side view of a solenoid assembly, according to embodiments of the present invention.

A solenoid assembly according to the present invention is shown in FIG. 1 generally at 10. The solenoid assembly 10 includes a solenoid portion, shown generally at 12, and a valve portion, shown generally at 14. The solenoid portion 12 includes a plate 18 connected to a yoke ring 20 by a press-fit connection, but it is within the scope of the invention that other types of connections may be used.

The yoke ring 20 partially surrounds an outer surface of a coil 22, and the coil 22 at least partially surrounds a bobbin 24. The bobbin 24 at least partially surrounds a sleeve 26, and the sleeve 26 partially surrounds a housing 30. The sleeve 26 includes closed end having a cavity, shown generally at 16, and located in the cavity 16 of the sleeve 26 is an armature 36, which is able to move relative to the housing 30. The armature 36 also includes a stepped portion, shown generally at 38, which is shaped to correspond to a stepped portion, shown generally at 40, formed as part of the housing 30. A back spring 28 is disposed in the cavity 16 between an inner wall 32 of the cavity 16 and the armature 36. The inner wall 32 is formed as part of the sleeve 26, such that the sleeve 26 forms the cavity 16 in which the armature 26 and back spring 28 are located. The armature 36 includes a recess, shown generally at 34, the back spring 28 is partially disposed in the recess 34, and the back spring 28 biases the armature 36 away from the inner wall 32.

Another spring 42, which in this embodiment is a return spring 42, is disposed between the armature 36 and the housing 30. More specifically, the spring 42 is partially disposed in a second recess, generally at 44, formed as part of the armature 36, and the spring 42 is also partially disposed in a recess, shown generally at 46, formed as part of the housing 30. The spring 42 biases the armature 36 away from the housing 30, the function of which will be described later.

In one embodiment, the springs 28,42 are hot preset springs 28,42, which helps to ensure a constant spring preload over the lifetime use of the springs 28,42, and have stable force balancing between the magnetic and hydraulic forces in the solenoid assembly 10.

The armature 36 also has an aperture 48, and a plunger 50 is press-fit into the aperture 48. However, it is within the scope of the invention that plunger 50 may be held in place in the aperture 48 in other ways. The plunger 50 extends through another aperture 52 formed as part of the housing 30. The plunger 50 and armature 36 are also movable relative to the housing 30, such that a portion of the plunger 50 slides within the aperture 52 formed as part of the housing 30, and the aperture 52 of the housing 30 also functions to guide to the movement of the plunger 50, and prevents the armature 36 from moving relative to the sleeve 26 in an undesirable manner.

The housing 30 also includes an exhaust port 54, which is in fluid communication with an intermediary port 56, the intermediary port 56 is in fluid communication with a control port 58, and the control port 58 is in fluid communication with a supply port 60. Disposed in the intermediary port 56 is a first insert 62, and the first insert 62 includes an exhaust seat 64. Disposed in the supply port 60 is a second insert 66, and the second insert 66 includes a supply seat 68. The first insert 62 is press-fit into the intermediary port 56, and the second insert 66 is press-fit into the supply port 60. The plunger 50 also includes a reduced diameter portion 70 which extends through the intermediary port 56 and partially into the control port 58. The reduced diameter portion 70 contacts a valve, which in this embodiment is a ball 72, but it is within the scope of the invention that other types of valves may be used. The reduced diameter portion 70 and the ball 72 are part of the valve portion 14.

In operation, pressurized fluid flows into the supply port 60 and flows into the control port 58 because the spring 42 biases the valve portion 14 to an open position when no current is applied to the coil 22, and the combined hydraulic force in the supply port 60 and the force in the spring 42 applied to the armature 36 is greater than the force from the back spring 28 applied to the armature 36 (the ball 72 is in contact with the exhaust seat 64 when the valve portion 14 is in the open position, as shown in FIG. 1). When current is applied to the coil 22, the combined force of the back spring 28 and magnetic force applied to the armature 36 overcomes the combined force of the spring 42 against the armature 36 and the hydraulic force in the supply port 60, such that the armature 36 moves toward the housing 30, and therefore the plunger 50 also moves the ball 72 away from the exhaust seat 64 and toward the supply seat 68, preventing some of the fluid from passing from the supply port 60 to the control port 58. As this occurs, fluid in the control port 58 flows through the intermediary port 56 and through the exhaust port 54. If enough current is applied to the coil 22, the armature 36 and plunger 50 move the ball 72 such that the ball 72 contacts the supply seat 68, such that all of the fluid is prevented from flowing through the supply port 60.

When the ball 72 is in the open position, as shown in FIG. 1, there is an air gap between the armature 36 and the housing 30, and the stepped portions 38,40 of the armature 36 and housing 30 create a larger air gap between the armature 36 and the housing 30, as compared to an armature and housing not having stepped portions 38,40. This increased air gap allows for an increased force output between the armature 36 and the housing 30 when the coil 22 is energized, and provides for better control over movement of the armature 36 when the coil 22 is energized to place the armature 36 in various positions between the inner wall 32 and the housing 30.

If enough current is applied to the coil 22, the armature 36 and plunger 50 move close enough to the housing 30 to allow the ball 72 to contact the supply seat 68, preventing any fluid from flowing from the supply port 60 into the control port 58. However, when the solenoid assembly 10 is used in certain applications, current is applied to the coil 22 to move the armature 36 and allow the ball 72 to move away from the exhaust seat 64, and provide a pressure balance between the supply port 60 and the control port 58. Additionally, the current applied to the coil 22 may be varied to control the fluid passing between the supply port 60 and control port 58, and therefore control the fluid pressure in the supply port 60 and control port 58.

Figure 2:
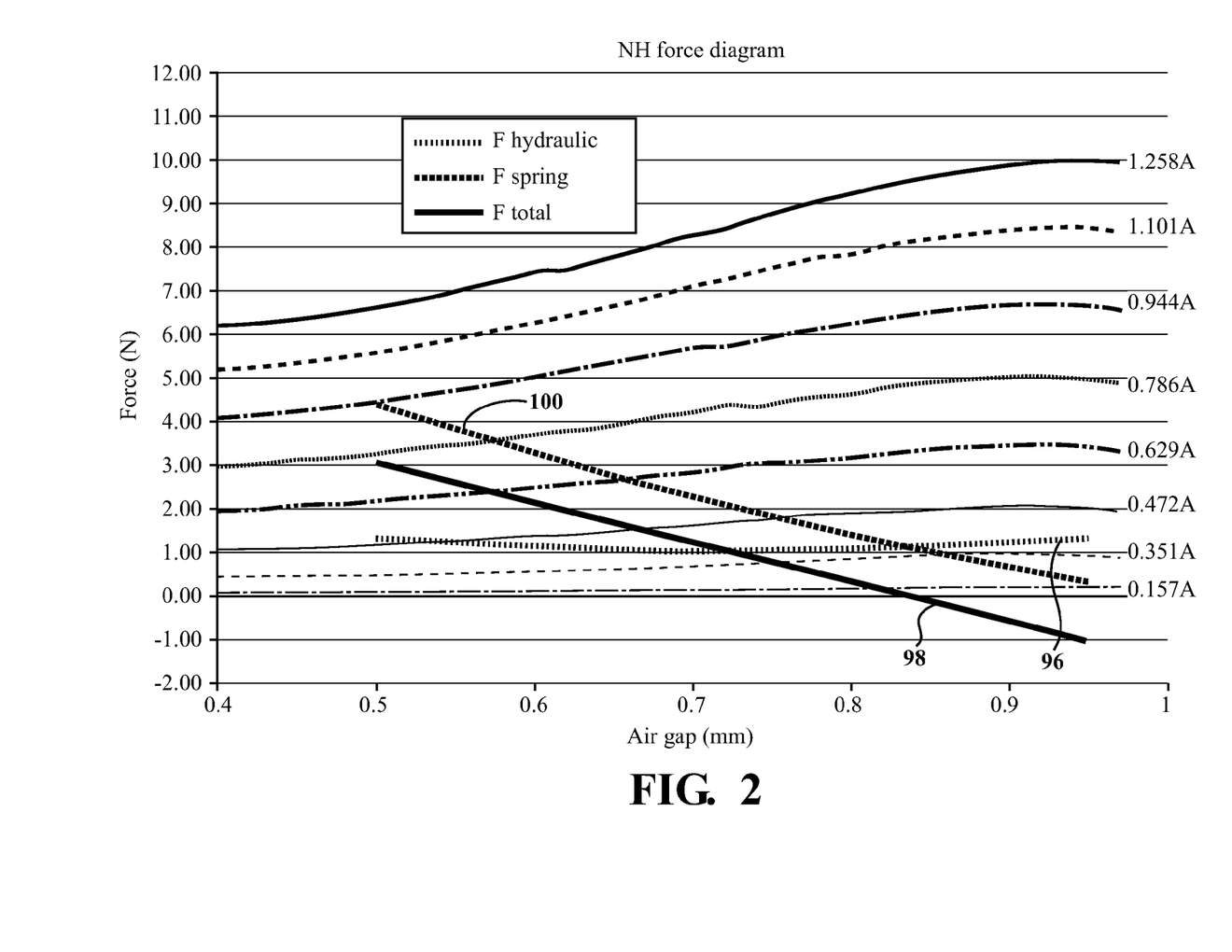
FIG. 2 is a force balance diagram of a solenoid assembly, according to embodiments of the present invention.

Once the current is no longer applied to the coil 22, there is no longer a magnetic attraction between the armature 36 and the housing 30, and the spring 42 moves the plunger 50 and armature 36 away from the housing 30, and therefore moves the ball 72 toward the exhaust seat 64 to place the valve portion 14 in the open position. As the ball 72 moves closer to the exhaust seat 64, less fluid is allowed to pass through the exhaust port 54, and more fluid is forced to flow from the supply port 60 through the control port 58. The amount of current applied to the coil 22 may be varied to vary the position of the armature 36, plunger 50, and therefore the ball 72, to vary the amount of fluid passing from the supply port 60 to the control port 58 and exhaust port 54. Furthermore, the current applied to the coil 22 may also be varied to control the position of the armature 36, plunger 50, and ball 72 to provide a pressure balance between the supply port 60 and control port 58, with excess fluid passing though the exhaust port 54. A chart depicting the force balance relationship between the current applied to the coil 22, the force applied to the armature 36 by the springs 28,42, and the position of the armature 36 is shown in FIG. 2. The current shown as part of the chart in FIG. 2 includes several curves depicting current verses force at multiple currents. The curve for the hydraulic force is shown at 96, the curve for the spring force is shown at 98, and curve for the summation of the hydraulic force 96 and spring force 98 is shown at 100.

Figure 3:
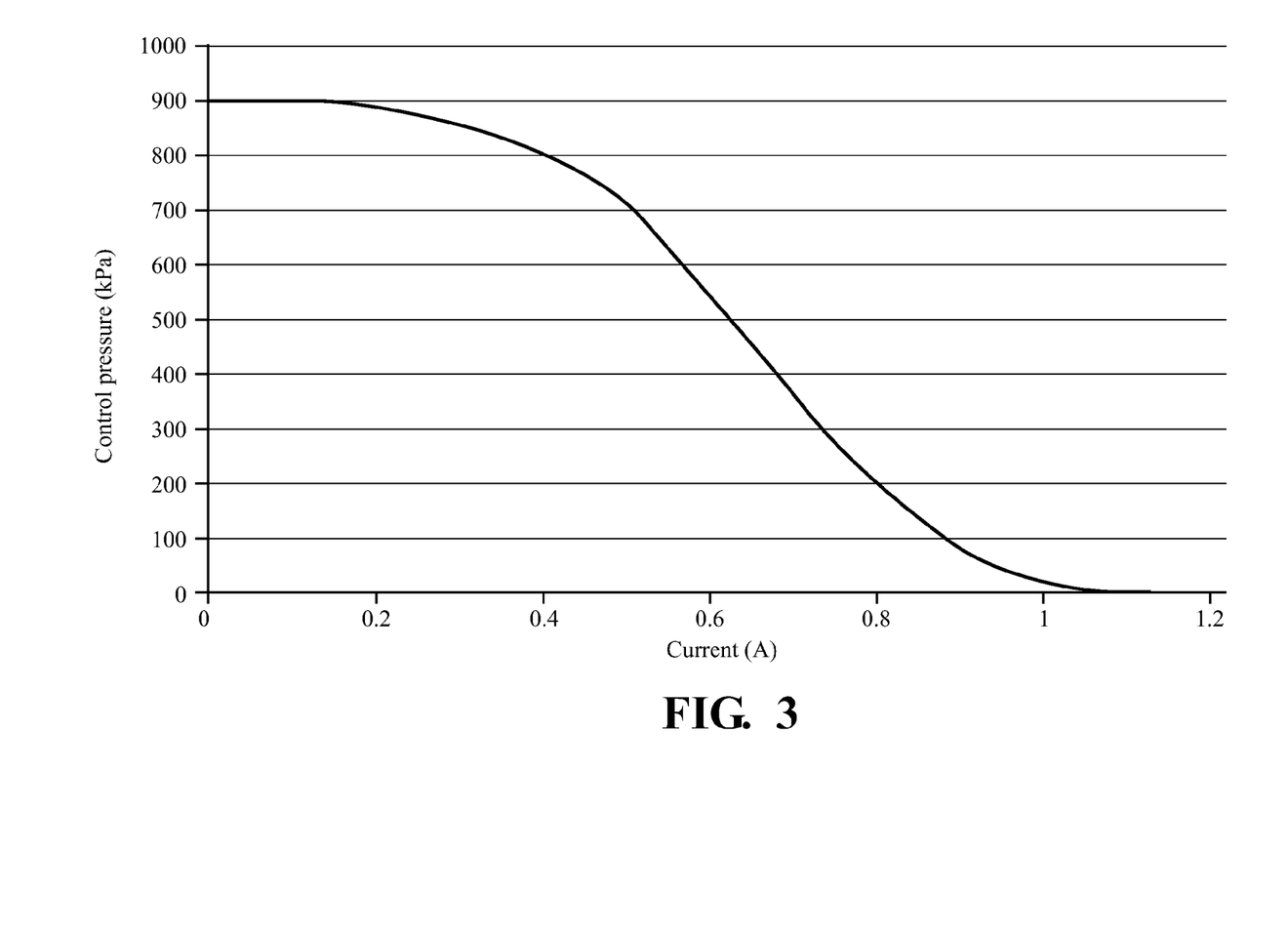
FIG. 3 is a diagram depicting pressure versus current characteristics of a solenoid assembly, according to embodiments of the present invention.

A chart depicting the pressure in the control port 58 versus the current applied to the coil 22 is shown in FIG. 3. The solenoid assembly 10 of the present invention is referred to as a "normally high" solenoid assembly, in reference to the state of the output. When no current is applied to the coil 22 (the solenoid assembly 10 is inactive), the ball 72 is in contact with the exhaust seat 64, and the pressure in the control port 58 is substantially equal to the pressure in the supply port 60. The pressure in the ports 54,58,60 may be detected using one or more pressure sensors. As the current is applied to the coil 22 and then increased, the ball 72 moves away from the exhaust seat 64 and closer to the supply seat 68, reducing the pressure in the control port 58. This relationship of increase in current applied to the coil 22 and decrease in pressure in the control port 58 is shown in FIG. 3. In one embodiment, the solenoid assembly 10 is used as part of a closed-loop feedback control system in a transmission.

The solenoid assembly 10 also has several features to prevent debris from flowing into the area around the armature 36. The plunger 50 includes several ribs 74, and the ribs 74, along with the location of the plunger 50 in the aperture 52, create a tortuous path for the flow of the fluid, and therefore limits or prevents debris from flowing past the plunger 50 and around the armature 36. The ribs 74 also reduce friction between the plunger 50 and the aperture 52, and the fluid in the ribs 74 also provides lubrication to reduce wear. In one embodiment, the armature 36 is also coated with a Teflon coating to reduce friction between the armature 36 and the sleeve 26.

To facilitate optimal contact between the ball 72 and the supply seat 68 and contact between the ball 72 and the exhaust seat 64, both the supply seat 68 and exhaust seat 64 have a tapered edge, or sharp edge 68A and 64A respectively, which balances forces under flow conditions. The seats 64,68 also ensure stable functionality over various temperature ranges, and control leakage over the lifetime of the assembly. The shape of the edges 64A,68A minimize the hydraulic force variations at constant supply pressure during positioning of the ball 72, and ensure a stable sealing diameter and hydraulic force on the ball 72 over the lifetime of the assembly 10.

Figure 4:
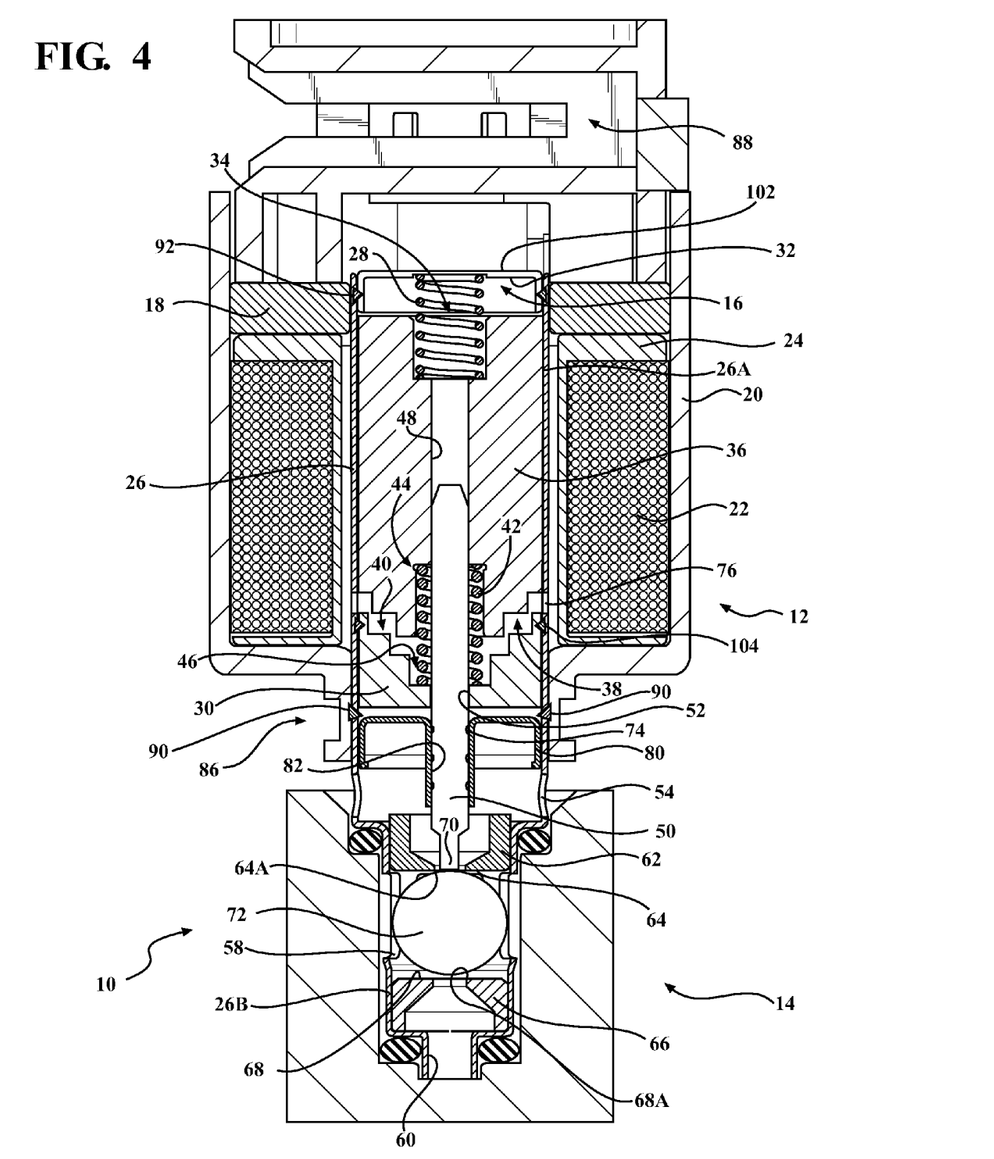
FIG. 4 is a sectional side view of an alternate embodiment of a solenoid assembly, according to embodiments of the present invention.
Figure 5:
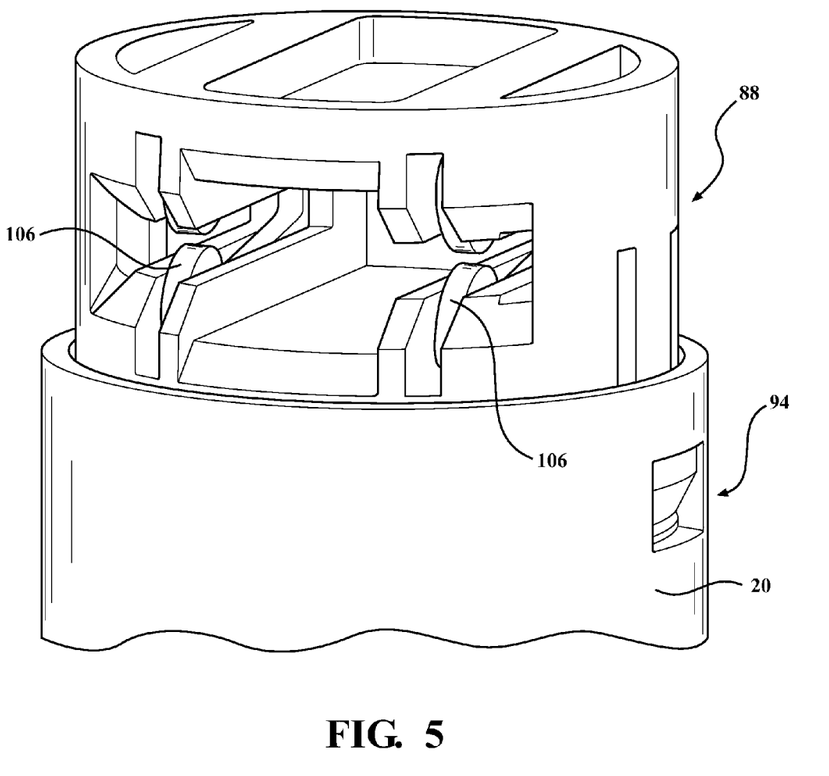
FIG. 5 is a perspective view of a cap connected to a yoke, which is part of an alternate embodiment of a solenoid assembly, according to embodiments of the present invention.

Another embodiment of the present invention is shown in FIG. 4-5, with like numbers referring to like elements. However, in this embodiment, the sleeve 26 is larger such that the sleeve 26 contains the housing 30, the armature 36, and the valve portion 14. Additionally, the inner wall 32 is not formed as part of the sleeve 26, but rather the inner wall 32 is formed as part of an inner cap 102, which is connected to the sleeve 26. In one embodiment, the sleeve 26 is a deep drawn part, containing all the parts of the valve portion 14, but it is within the scope of the invention that other manufacturing processes may be used to create the sleeve 26. The sleeve 26 shown in FIG. 4 is magnetic conductive to optimize the magnetic forces between the armature 36 and the magnet core 16. In one embodiment, the armature 36 shown in FIG. 4 has a Teflon coating to reduce friction between the armature 36 and the sleeve 26, and reduce the magnetic eccentric forces. The housing 30 in this embodiment is shaped differently compared to the housing 20 shown in FIG. 1, and does not have the exhaust port 54, the intermediary port 56, the control port 58, or the supply port 60.

Formed as part of the sleeve 26 are exit apertures 76, and fluid around the armature 36 is able to flow out of the exit apertures 76, around the sleeve 26, and out one or more grooves (not shown) formed as part of the bobbin 24. The exit apertures 76 and the grooves provide pressure equilibrium around the armature 36, such that any fluid that flows into the area around the armature 36 has little to no effect on the movement of the armature 36. Additionally, the flow path through the exit apertures 76 and the grooves creates a tortuous path to prevent dirt migration into the air gap between the armature 36 and housing 30 from outside of the assembly 10.

The sleeve 26 in this embodiment has two portions, a large diameter portion 26A and a small diameter portion 26B. The armature 36 and housing 30 are located in the large diameter portion 26A, and the valve portion 14 is located in the small diameter portion 26B. More specifically, both of the inserts 62,66 and the ball 72 are located in the small diameter portion 26B of the sleeve 26. The ball 72 in this embodiment has a larger diameter than the ball 72 shown in FIG. 1, which reduces hydraulic force variations in the valve portion 14.

Additionally, the exhaust port 54 is formed as part of the large diameter portion 26A, the control port 58 is formed as part of the small diameter portion 26B, and the supply port 60 is formed as part of the small diameter portion 26B. The supply port 60 shown in FIG. 4 extends outwardly away from the second insert 66, and has a diameter that is smaller than the diameter of the small diameter portion 26B.

Also, in this embodiment, there is a separation plate 80 located within the sleeve 26 between the housing 30 and the valve portion 14, and the plate 80 has an aperture 82 which the plunger 50 extends through. The separation plate 80 is located in the large diameter portion 26A of the sleeve 26 in an area between the housing 30 and the exhaust port 54. The separation plate 80 separates the valve portion 14 from the solenoid portion 12, preventing the solenoid portion 12 from being exposed to the fluid in the valve portion 14. In one embodiment, the separation plate 80 is a deep drawn part, but it is within the scope of the invention that other methods may be used to form the separation plate 80. To further prevent debris from flowing into the area around the armature 36, the plunger 50 in this embodiment also includes several ribs 74 which create a tortuous path for the flow of the fluid, and therefore limits or prevents debris from flowing past the plunger 50 and around the armature 36. The ribs 74 also reduce friction between the plunger 50 and the aperture 82, and the fluid in the ribs 74 also provides lubrication to reduce wear.

The yoke ring 20 in this embodiment is larger than the yoke ring 20 shown in FIG. 1, and also includes several retention features shown at 86. The retention features 86 are integrally formed with the yoke ring 20, and the yoke ring 20 in this embodiment is formed as a single piece, and as a deep drawn part, but it is within the scope of the invention that other methods may be used to form the yoke ring 20. The sleeve 26 is connected to the yoke ring 20 through the use of a first weld connection 90, the sleeve 26 is also connected to the inner cap 102 through the use of a second weld connection 92, and the housing 30 in this embodiment is connected to the sleeve 26 through the use of a third weld connection 104.

The embodiment shown in FIG. 4 also includes a cap, shown generally at 88, which connects with and is surrounded by part of the yoke ring 20. The cap 88 is connected to the yoke ring 20 through a snap-fit connection, shown generally at 94, in FIG. 5. The snap fit connection 94 also functions to properly position the cap 88 relative to the yoke ring 20, such that any data marking on the cap 88 is correctly positioned as well. Furthermore, the cap 88 also protects electrical terminals 106 from becoming exposed and contaminated by the fluid.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a solenoid assembly, including:
        a solenoid portion;
        a sleeve, a portion of the sleeve disposed within the solenoid portion;
        a plurality of ports formed as part of the sleeve;
        a valve disposed within the sleeve in proximity to the plurality of ports;
        a valve seat, the valve selectively in contact with the valve seat;
        an armature located within the sleeve, the armature being part of the solenoid portion;
        an inner cap connected to the sleeve;
        a back spring located between the inner cap and the armature, the back spring biasing the armature toward the housing and the valve;
        a housing located within the sleeve;
        a return spring located within the sleeve between the housing and the armature, the return spring biasing the armature away from the housing and the valve, such that the force applied to the armature by the return spring and the force applied to the valve from fluid in one of the plurality of ports is greater than the force applied to the armature from the back spring, biasing the valve to an open position;
        a plunger connected to the armature, the plunger extending through the housing and the return spring such that the plunger is in contact with the valve;
        a supply port formed as part of the sleeve, the supply port in fluid communication with the valve;
        a control port formed as part of the sleeve, the control port in fluid communication with the valve; and
        an exhaust port formed as part of the sleeve, the exhaust port in fluid communication with the valve;
        wherein the force applied to the armature from the back spring combines with the movement of the armature generated by the solenoid portion to overcome the force applied to the armature by the return spring and the force applied to the valve by the fluid in one of the plurality of ports to move the armature and plunger relative to the housing such that the valve moves relative to the valve seat to control the pressure balance between the plurality of ports, and the fluid in the supply port applies pressure to the valve, and the valve is moved by the armature and the plunger to balance fluid pressure between the supply port and the control port, and when the valve is moved from the open position to the closed position, excess fluid pressure in the sleeve is relieved in the exhaust port.

2. The apparatus of claim 1, further comprising:
    a coil being part of the solenoid portion, the coil surrounding the sleeve;
    wherein the coil is energized to generate magnetic force and move the armature towards the housing, such that when the combined force applied to the armature by the solenoid portion and force applied to the armature by the back spring is greater than the force applied to the armature by the return spring and the force applied to the valve by the fluid in one of the plurality of ports, the valve moves towards the closed position.

3. The apparatus of claim 1, the sleeve further comprising:
    a large diameter portion, the armature slidably disposed in the large diameter portion; and
    a small diameter portion integrally formed with the large diameter portion;
    wherein the exhaust port is formed as part of the large diameter portion, and the supply port and the control port are formed as part of the small diameter portion.

4. The apparatus of claim 1, the valve seat further comprising:
    a supply seat disposed in the sleeve in proximity to the valve and the plurality of ports; and
    an exhaust seat disposed in the sleeve in proximity to the valve and the plurality of ports;
    wherein the valve moves between the supply seat and the exhaust seat to balance the pressure between the plurality of ports.

5. The apparatus of claim 4, the valve seat further comprising:
    a first insert located in the sleeve in proximity to the valve and the plurality of ports; and
    a second insert located in the sleeve in proximity to the valve and the plurality of ports;
    wherein the exhaust seat is formed as part of the first insert, and the supply seat is formed as part of the second insert.

6. The apparatus of claim 1, further comprising a separation plate located in the sleeve between the housing and the valve, the plunger extending through the separation plate, wherein the separation plate substantially prevents fluid from flowing around the armature.

7. A solenoid valve assembly, comprising:
    a solenoid portion;
    a sleeve;
    an armature slidably disposed within the sleeve, the armature being part of the solenoid portion;
    a housing located within the sleeve;
    a return spring located within the sleeve in between the housing and the armature, the return spring biasing the armature away from the housing;
    a back spring in contact with the armature, such that the back spring biases the armature towards the housing;
    a plunger connected to the armature, the plunger extending through the housing;

a valve portion controlled by the solenoid portion such that the solenoid portion is able to change the valve portion between an open position and a closed position;

a valve in contact with the plunger, the valve being part of the valve portion;

a valve seat, the valve selectively in contact with the valve seat, the valve being part of the valve portion;

a plurality of ports formed as part of the sleeve in proximity to the valve portion;

a bobbin surrounding at least a portion of the sleeve;

a coil surrounding the bobbin;

a supply seat, the valve selectively in contact with the supply seat; and an exhaust seat, the valve selectively in contact with the exhaust seat;

wherein the return spring biases the armature away from the housing such that the valve is biased towards the open position to allow fluid to pass through one or more of the plurality of ports, and the solenoid portion is selectively activated to apply force to the valve such that the force from the solenoid portion and the force from the back spring overcomes the force applied to the armature by the return spring to move the valve relative to the valve seat to the closed position to prevent fluid from passing through one or more of the plurality of ports, the armature moves towards the housing when a current is applied to the coil, changing the valve from the open position to the closed position, and the valve is moved away from the supply seat and towards the exhaust seat when the valve is changed from a closed position to an open position.

8. The solenoid valve assembly of claim 7, the valve seat further comprising:

a first insert disposed in the small diameter portion of the sleeve, the exhaust seat formed as part of the first insert; and a second insert disposed in the small diameter portion of the sleeve, the supply seat formed as part of the second insert;

wherein the first insert and the second insert are press-fit into the sleeve.

9. The solenoid valve assembly of claim 8, the sleeve further comprising:

a large diameter portion; and a small diameter portion integrally formed with the large diameter portion, each of the plurality of ports integrally formed as part of the small diameter portion;

wherein the armature is disposed in the large diameter portion, and the first insert and the second insert are disposed in the small diameter portion.

10. The solenoid valve assembly of claim 7, wherein the force applied to the armature by the return spring is greater than the force applied to the armature by the back spring, and hydraulic force in one or more of the plurality of ports applied to the valve and the force applied to the armature from the return spring biases the valve to the open position.

11. The solenoid valve assembly of claim 7, wherein the valve moves towards the closed position when the magnetic force generated by the coil and the force applied to the armature by the back spring is greater than the combined force of the spring applied to the armature and hydraulic force applied to the valve in one or more of the plurality of ports.

12. The solenoid valve assembly of claim 7, the plurality of ports further comprising:

a supply port formed as part of the sleeve, the supply port in fluid communication with the valve;

a control port formed as part of the sleeve, the control port in fluid communication with the valve; and an exhaust port formed as part of the sleeve, the exhaust port in fluid communication with the valve;

wherein fluid in the supply port applies hydraulic force to the valve, and the valve is moved relative to the valve seat by the armature and the plunger to balance fluid pressure between the supply port and the control port, and when the valve is moved from the open position to the closed position, excess fluid pressure around the valve is relieved in the exhaust port.

13. The solenoid valve assembly of claim 7, wherein the sleeve surrounds the armature and the valve portion.

14. The solenoid valve assembly of claim 7, further comprising a separation plate surrounded by the sleeve, wherein the separation plate separates the solenoid portion and the valve portion.

15. The solenoid assembly of claim 7, further comprising a inner cap connected to the sleeve, the back spring disposed between the armature and the inner cap.

16. A solenoid assembly for a transmission, comprising:

a sleeve;

a valve portion substantially contained within the sleeve;

an armature located within the sleeve;

a plunger connected to the armature, and in contact with the valve;

a housing located within the sleeve in proximity to the armature, the armature being moveable relative to the sleeve and the housing;

a valve being part of the valve portion, the movement of the valve controlled by the movement of the armature;

a inner cap connected to the sleeve;

a back spring located within the sleeve in between the inner cap and the armature, such that the back spring biases the armature away from the inner cap and toward the housing, such that the back spring biases the valve toward a closed position;

a return spring disposed between the housing and the armature, the return spring biasing the armature away from the housing and toward the inner cap, such that the return spring biases the valve toward an open position;

a supply port formed as part of the sleeve, such that the supply port receives fluid and the supply port is in fluid communication with the valve portion;

a valve seat being part of the valve portion and surrounded by the sleeve, the valve selectively in contact with the valve seat;

a control port formed as part of the sleeve such that the control port is in fluid communication with the valve portion;

an exhaust port formed as part of the sleeve, such that the exhaust port is in fluid communication with the valve portion;

a coil at least partially surrounding the sleeve, the coil being part of the solenoid portion; and a separation plate located within the sleeve, the separation plate separating the valve portion from the solenoid portion, the plunger extending through the separation plate;

wherein, the combined force from the return spring and hydraulic force applied to the valve in the supply port overcomes the force applied to the armature by the back spring to place the valve in the open position when the coil is de-energized, allowing fluid in the supply port to flow into the control port, and when the coil is energized, the magnetic force between the armature and the housing and the force applied to the armature from the back spring overcomes the force applied to the armature by the return spring and hydraulic force applied to the valve in the supply port, moving the valve towards the valve seat such that portion of the fluid in the supply port flows through the control port, and a portion of the fluid in the supply port flows through the exhaust port.

17. The solenoid assembly for a transmission of claim 16, wherein the coil is energized to move the armature, the plunger, and valve between the open position and closed position to provide a pressure balance between the fluid in the supply port and the fluid in the control port.

18. The solenoid assembly of claim 16, the sleeve further comprising:
   a small diameter portion; and
   a large diameter portion integrally formed with the small diameter portion;
   wherein the armature is substantially surrounded by the large diameter portion, and the valve portion is substantially surrounded by the small diameter portion.

19. The solenoid assembly of claim 18, wherein the supply port, the control port, and the exhaust port are all integrally formed as part of the small diameter portion of the sleeve.

20. The solenoid assembly of claim 18, wherein the separation plate is disposed in the large diameter portion of the sleeve.

21. The solenoid assembly of claim 18, the valve portion further comprising:
   a first insert disposed in the small diameter portion of the sleeve;
   an exhaust seat formed as part of the first insert;
   a second insert disposed in the small diameter portion of the sleeve; and
   a supply seat formed as part of the second insert;
   wherein the valve is in contact with the supply seat when the valve is in the closed position, and the valve moves away from the supply seat and towards the exhaust seat when the valve is moved to the open position.

22. The solenoid assembly of claim 16, wherein the separation plate is located in the sleeve between the exhaust port and the armature.

* * * * *